United States Patent
Ofer

(10) Patent No.: US 7,516,348 B1
(45) Date of Patent: Apr. 7, 2009

(54) SELECTIVE POWER MANAGEMENT OF DISK DRIVES DURING SEMI-IDLE TIME IN ORDER TO SAVE POWER AND INCREASE DRIVE LIFE SPAN

(75) Inventor: Adi Ofer, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 388 days.

(21) Appl. No.: 11/361,907

(22) Filed: Feb. 24, 2006

(51) Int. Cl.
*G06F 1/32* (2006.01)

(52) U.S. Cl. .............................. 713/324; 714/7; 365/28

(58) Field of Classification Search ................. 713/323, 713/324; 714/5, 7, 8; 711/114; 365/28
See application file for complete search history.

(56) References Cited

U.S. PATENT DOCUMENTS

| | | | |
|---|---|---|---|
| 5,423,046 A * | 6/1995 | Nunnelley et al. ......... | 713/330 |
| 6,959,399 B2 | 10/2005 | King et al. | |
| 6,961,815 B2 | 11/2005 | Kistler et al. | |
| 7,035,972 B2 | 4/2006 | Guha et al. | |
| 7,234,074 B2 | 6/2007 | Cohn et al. | |
| 7,380,088 B2 * | 5/2008 | Wang et al. ................. | 711/170 |
| 2002/0199129 A1 * | 12/2002 | Bohrer et al. .................. | 714/7 |
| 2005/0154962 A1 | 7/2005 | Grover et al. | |

* cited by examiner

*Primary Examiner*—Thuan N Du
(74) *Attorney, Agent, or Firm*—BainwoodHuang

(57) ABSTRACT

Redundancy in storage arrays is used to extend the life of disk drives and conserve power. In an exemplary storage array, a group of storage devices includes y storage devices. Data and redundant information is distributed across the y devices to provide m levels of redundancy. "Spun down devices" are provided by spinning down a set of one or more of up to m of the y storage devices. Meanwhile, data transfers to and from the group of storage devices continue to be serviced. After a predetermined time, the currently spun down disks can be spun up, and new spun down devices are provided by spinning down another set of one or more of m of the y storage devices. An array may include several groups of storage devices, each having its own value for y and m.

25 Claims, 14 Drawing Sheets

SELECTIVE POWER MANAGEMENT OF DISK DRIVES DURING SEMI-IDLE TIME IN ORDER TO SAVE POWER AND INCREASE DRIVE LIFE SPAN

FIELD OF THE INVENTION

The present invention relates generally to the field of storage systems, and particularly to power management of disk drives in storage arrays.

BACKGROUND OF THE INVENTION

Today's enterprise data centers store ever-larger amounts of business critical data that must be immediately available and highly reliable. To meet reliability requirements for critical data, arrays of groups of disks are often employed. One type of array is known as a redundant array of independent disks (RAID array). Within a RAID array, data is distributed across groups of disks ("RAID groups") in a manner consistent with the RAID level implemented, from full mirroring to parity protection.

As applications demand larger amounts of storage, RAID arrays include many, even thousands, of disks. In order to control costs, inexpensive disk drives of the sort used in personal computers are often employed in RAID arrays. Such disks are not typically designed to work at a high duty cycle. Rather, these disks are designed to be spun down during periods of non-use. For instance, when a personal computer sits idle, the disk drive spins down and "sleeps" until a user re-engages the computer. When such disk drives are employed in RAID arrays, they often remain spun up and active indefinitely. This can cause the disk drives to fail sooner than they would if used in the environment for which they were originally designed. Furthermore, keeping all the disk drives in the RAID array spun up all the time uses relatively high power. It would be advantageous to use disk drives in RAID arrays in a manner that would extend the life of the disk drives and conserve power while offering adequate service to the customer.

SUMMARY OF THE INVENTION

In accordance with the principles of the invention, the redundancy provided in storage arrays is used to extend the life of disk drives and conserve power in a manner transparent to hosts or applications using the array.

Accordingly, a storage array embodying the invention includes groups of storage devices. For each group, data and redundant information is distributed across y storage devices to provide m levels of redundancy. The redundant information is usable to reconstruct the data in the event of a device failure. Each group may have different values for y and m. An example of a storage group in such an array would be a RAID level 6 array, wherein y=8 storage devices and m=2 redundant storage devices. Another group in the array may be a RAID level 4 array, wherein y=6 devices and m=1 device. For one or more of the groups of disk drives, "spun down devices" are provided by spinning down a set of one or more of up to m of the y storage devices. Meanwhile, data transfers to and from the groups of storage devices are serviced in accordance with the redundancy and recovery algorithm employed for the group.

The spun down disks may be spun down for a predetermined period of time. In this case, after the predetermined time, the currently spun down disks are spun up, and new spun down devices are provided by spinning down another set of one or more of up to m of the y storage devices.

According to a further aspect of this embodiment of the invention, spun down devices are spun up in accordance with a policy. The policy may indicate for example that the one or more of the spun down devices should be spun up in the event of a failure of a device. The policy may also indicate for example that the one or more of the spun down devices should be spun up in the event that a write threshold has been exceeded, or a rebuild threshold has been exceeded, or a performance service level is not being met.

Significant power savings and extended disk drive life is obtained through implementation of the various embodiments of the invention in storage arrays.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
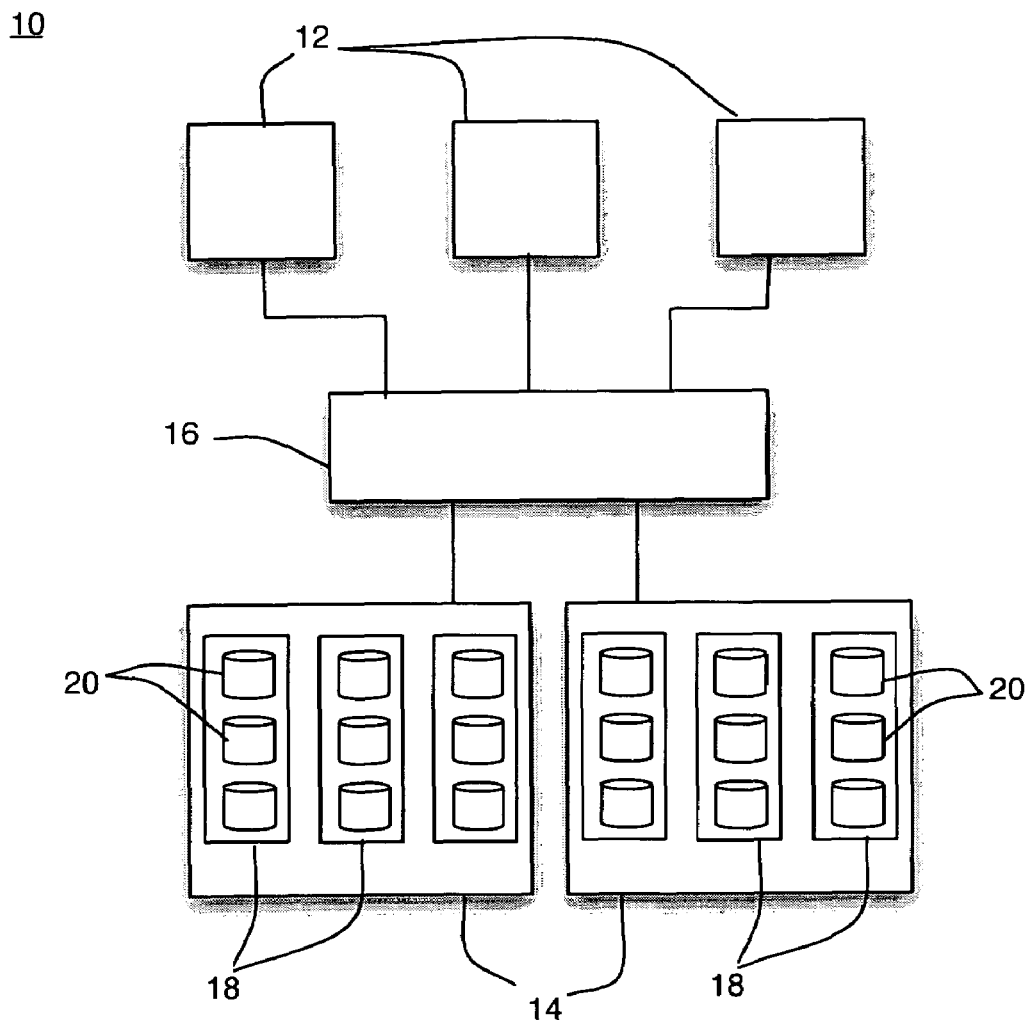
FIG. 1 is a representation of one type of network in which the invention can be implemented. The storage area network shown includes storage arrays and hosts coupled together via a switch.

In FIG. 1 there is shown a functional block diagram of an exemplary storage system 10 in which the invention can be implemented. The storage system 10 includes one or more hosts 12 coupled to one or more storage arrays 14. The storage arrays 14 are shown coupled to each host 12 via a switch 16; however, the switch 16 may or may not be present. Each array 14 includes groups 18 of storage devices 20. There are many types of storage devices, including but not limited to disk drives, tape drives, optical disks, and solid state memory. For purposes of example, the storage devices employed in the embodiments herein described are disk drives, though the invention applies to all types of storage devices in all types of storage systems. For example, the invention can be employed in file-based networks or block-level networks as well as the storage area network shown in FIG. 1.

Sufficient redundancy is provided in each group 18 to ensure that data can continue to be read from and written to the group 18 even after a limited number of disk drive failures. Such groups 18 are found for example in RAID ("Redundant Array of Independent Disks") arrays. There are many different types of RAID arrangements. In the most general case, a group of y disks includes m levels of redundancy, meaning that up to m failures can occur across the y disks with no loss of ability to transfer data to and from the group. For example, a RAID level 4 group consists of data disks and one parity disk. The parity disk is used to store parity across the group, so that if one disk in the group fails, data transfers can continue to and from the group. Thus, y disks in a RAID level 4 array include one level of redundancy. In accordance with some algorithms such as RAID level 5, data and redundant information can be distributed in a striped manner across all the y disks, and that the invention applies equally to such configurations. For example, in a RAID level 6 group, two levels of redundancy are distributed across the y disks. The redundant information may include parity, CRCs, ECC, or any other sort of error detection/correction information across the group. In this case, up to two disk failures can occur with no loss of ability to transfer data to and from the group. A disk "failure" as used herein includes any situation in which a read operation does not result in fully valid read data, or a write operation cannot be entirely completed. Such failures include but are not limited to entire disk failures, or failures limited to a particular disk sector or disk location, or transient failures that prevent a particular read or write operation from validly completing. Some such failures are repairable. Once the failures in a group are repaired, the disk(s) are selectively rebuilt—that is, the areas of the disk(s) on which the failures occurred are rebuilt as is known in the art in accordance with the redundancy protocol employed (e.g. RAID level 4 or RAID level 6), returning the group to full m level redundancy. For example, a failure occurring in one disk sector on a disk requires rebuilding of only the portion of the sector of the disk. If an entire failed disk is replaced, the new disk must be completely rebuilt.

In large arrays, RAID algorithms are important to implement in order to protect the data against disk failures. The invention takes advantage of the redundancy provided by a RAID group to save power and extend drive life.

The invention takes notice of the fact that not all disks in a RAID group are required to be spun up in order to perform data transfers. As previously described, RAID groups can suffer failures of a number of drives equal to the number of levels of redundancy with no loss of ability to transfer data to and from the RAID group. For example, in a RAID level 4 group, data transfers can continue after one drive failure occurs. In a RAID level 6 group, data transfers can continue after two drive failures occur. Some RAID groups 18 sit idle or are subject to minimal write activity at certain times; for example, during backup operations when the RAID group is the source of the backup, or during decision support system (DSS) or data mining operations. The invention realizes that during such times, data transfer operations can occur successfully without full RAID redundancy; thus, not all the drives in all the RAID groups need be spun up.

The invention is first described as it applies to a simple RAID level 4 array including RAID 4+1 groups. It is then described as it applies in the more general case of a RAID group including y disks incorporating m levels of redundancy.

Figure 2:
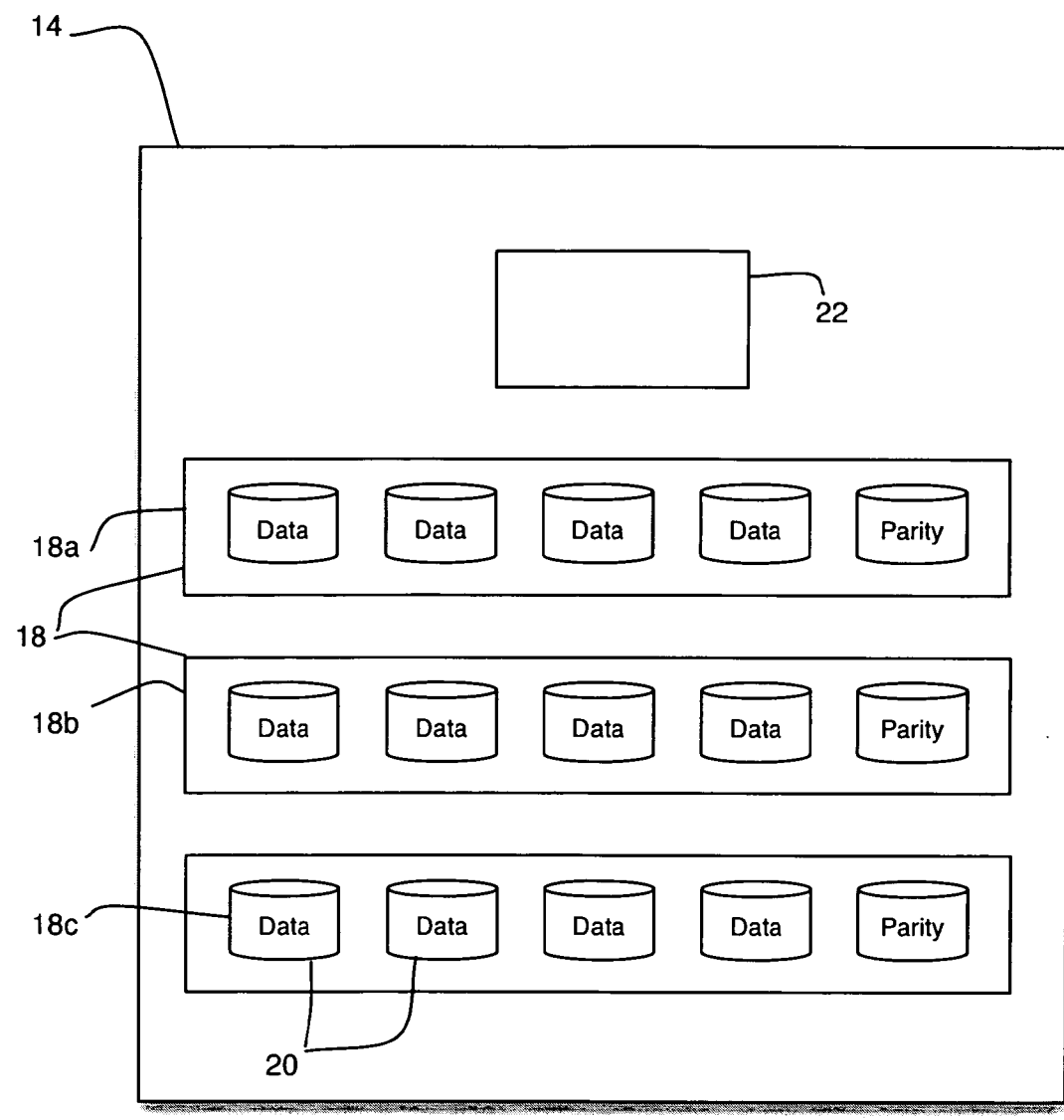
FIG. 2 is a more detailed representation of one of the storage arrays of FIG. 1, showing RAID groups.

In FIG. 2 there is shown an example of a RAID level 4 array. The array 14 is shown to include an array controller 22 and multiple RAID groups 18 of disk drives 20, herein shown as three RAID 4+1 groups 18a, 18b and 18c. Each group 18 of disks 20 includes four data disks and one parity disk. Whenever data is written to a group 18, parity is calculated across the data and written to the parity disk. In the event of a disk 20 failure in the group 18, the parity information can be used to recover all the data previously written to the group 18. When a failed data disk is recovered, the data disk is rebuilt as required.

In accordance with a first embodiment of the invention, at appropriate times, the storage array 14 enters a power save mode during which, for each RAID group 18, one disk drive 20 in the RAID group 18 is spun down for a period of time. Data transfer operations are performed by accessing the remaining drives in the RAID group 18. After the period of time expires, the disk 20 is spun back up and rebuilt where required, and another disk 20 in the group is spun down. This cycle continues until it is necessary to have all disks 20 in the array spun up, at which time the power save mode is disabled. Appropriate times for performing the spin down operations include for example array or group idle time, and time during which only backup or archiving operations are occurring on a source array or group. The times can be set by a user, or automatically detected by the array 14.

Figure 3:
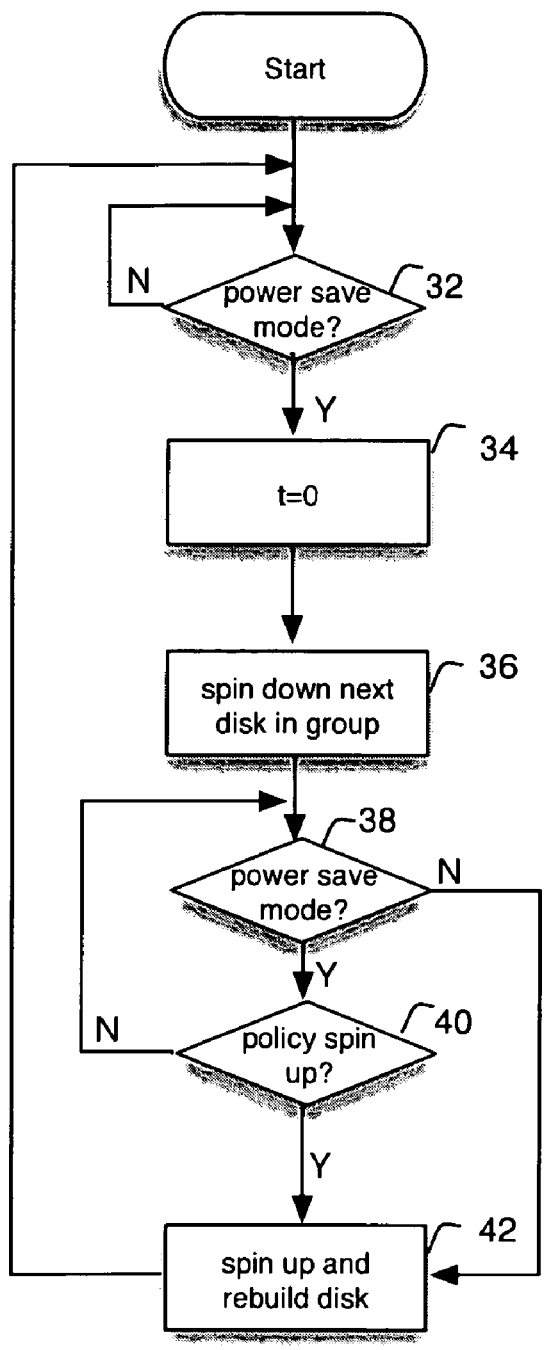
FIG. 3 is a flow diagram representing the operation of the array controller in accordance with one embodiment of the invention.

The process by which this embodiment of the invention operates is shown in detail in FIG. 3. The process of FIG. 3 is preferably executed by the array controller 22 for each RAID group 18 in the array 14. That is, the array controller 22 preferably employs one instance of the process of FIG. 3 for each RAID group 18a, b, and c. For a given RAID group such as RAID group 18a, the array controller 22 employs a timer t. The timer t measures the amount of time a disk 20 should remain spun down, and can vary based on design requirements. In one embodiment, a reasonable time t is about 8 hours.

The controller 22 monitors to detect whether a "power save mode" has been entered (step 32). Power save mode may be entered for all RAID groups 18, or separately for one or more RAID groups 18. The power save mode is preferably entered during periods of low or no data write activity. There are several ways by which the array controller 22 can determine whether to enter power save mode. For instance, when a backup or archiving process is launched for a source array 14, it is likely that one or more RAID groups 18 are not otherwise being used, therefore power save mode may be entered in response to the start of the backup process. Alternatively, if no write activity is detected for a certain minimum amount of time, for example 30 minutes, power save mode could be entered, and then disabled if substantial write activity occurs.

Once power save mode is initially entered for a given RAID group 18 (step 32), the timer t is reset (step 34). A first disk in then spun down (step 36). Power save mode is checked again (step 38), and if it is still enabled, then the array controller 22 checks to see if a policy spinup is indicated. If a policy spinup is indicated, the array controller 22 proceeds to spin up the disk (step 42). If writes to the group have occurred, the array controller 22 rebuilds the disk as needed. If power save mode is still enabled (step 32), then the next disk 20 is spun down (steps 34, 36). This process repeats so that each disk 20 in the group 18 is successively spun down and then later spun back up, until power save mode is disabled in accordance with a spin up policy.

The spin up policy of step 40 is applied to determine whether to spin up the spun down disk 20. The spin up policy can consider many different factors in this determination. For example, the policy can cause the disk to spin up after writes to the disk are detected, or after a certain threshold of writes has been exceeded, or after a backup process is terminated, or after a disk failure has occurred. The spin up policy could also cause the disk to spin up if a rebuild threshold has been exceeded. That is, if a disk suffers multiple errors to the point where a threshold number of rebuild operations is exceeded, the spun down disk might be spun up. Furthermore, the spin up policy could cause the disk to spin up if an I/O performance service level is not being met. That is, if I/O performance is sufficiently degraded because of disk failures, the disk might be spun up. For a group employing more than one level of redundancy, the policy can also consider how many disk failures have occurred. In accordance with a particular policy, a timer t is associated with each spun down disk. A timer value "spindown_time" is the amount of time that has been chosen for a given disk 20 to be spun down. If no other spin up policy causes the spun down disk to be spun up, a policy spin up will occur when the timer t=spindown_time.

The example of FIG. 3 is one of many ways in which the general process of the invention can be implemented. One skilled in the art will understand that modifications can be made to optimize design considerations. For example, one might choose to spin down the same disk every time power save mode is entered, rather than starting with the next one in line.

It is noted that occasional write operations can occur during power save mode. Write operations can be completed effectively when one disk in a 4+1 group is spun down. However, the data written to the array 14 during this time is not redundantly protected. Therefore, in further accordance with this embodiment of the invention, write operations occurring during power save mode are cached.

Figure 4:
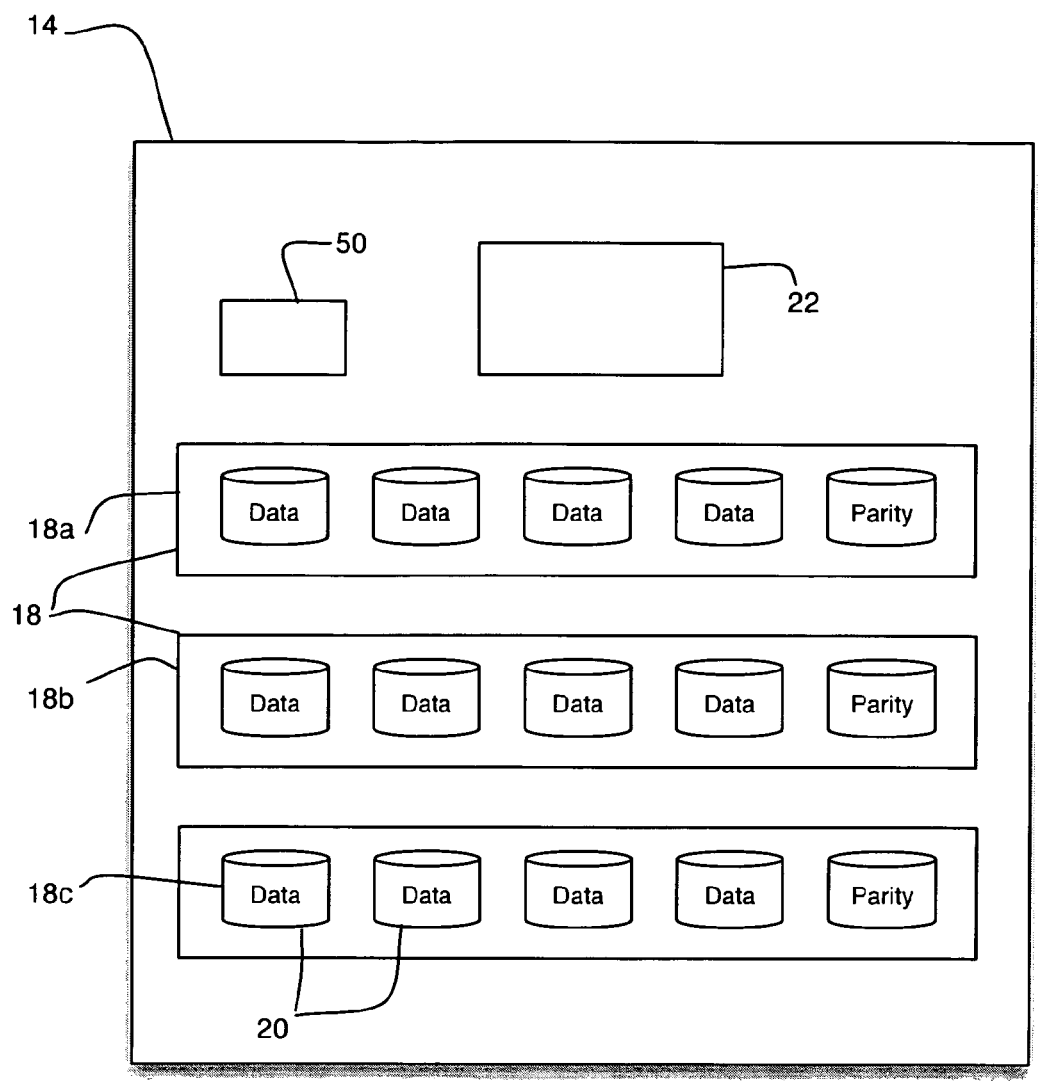
FIG. 4 is a representation of the storage array of FIG. 2 further including a cache.
Figure 5:
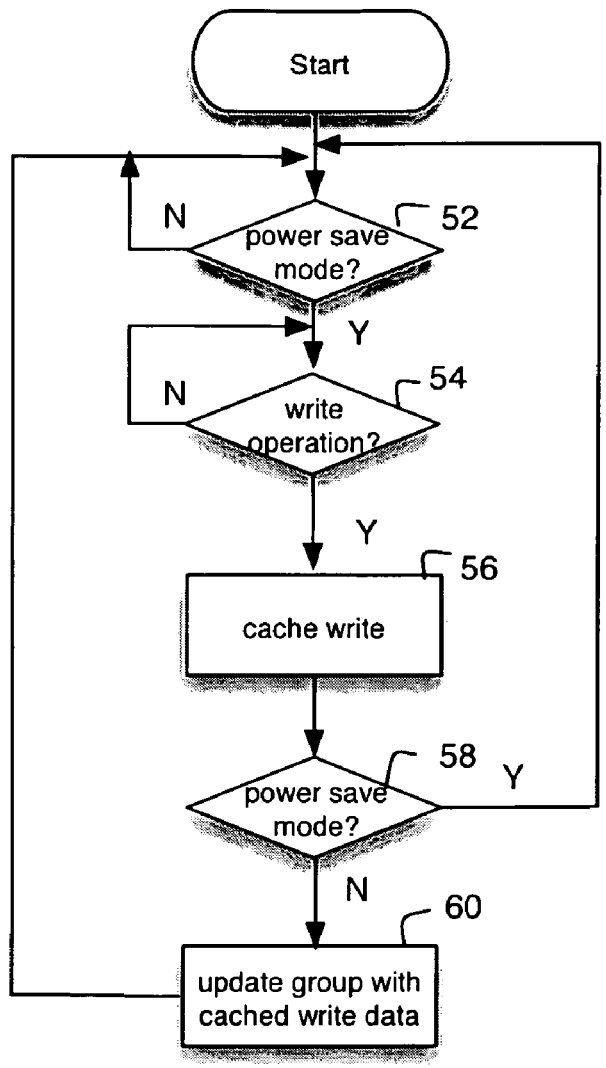
FIG. 5 is a flow diagram representing the write caching operation of the array controller during power save mode.

Many RAID arrays such as array 14 include caches for caching data before writing it to the disk drives. Cache data is typically stored in a non-volatile memory, or in volatile memory in a system with sufficient battery power to write all data back to disk before shutting down. Therefore, any data written during a power interruption is not at risk of being lost. In FIG. 4, the array 14 of FIG. 2 is shown now further including a cache 50. When power save mode is enabled, then if a write occurs, the write is held in cache 50 until the power save mode is disabled. Then, when power save mode is exited, the group 18 is updated with the cached data. The process by which the array controller 22 operates to support this functionality is shown in FIG. 5. If power save mode is enabled (step 52), and then a write operation occurs (step 54), the write is cached (step 56). Write caching continues until power save mode is disabled (step 58). When write caching is used, one of the policies by which power save mode is disabled monitors the write rate to the RAID group 18, or monitors the fullness of the cache 50. If the cache 50 is close to full, power save mode is disabled. When power save mode is disabled, the group 18 is updated by writing the cached data to the disks in the group (step 60).

Figure 6:
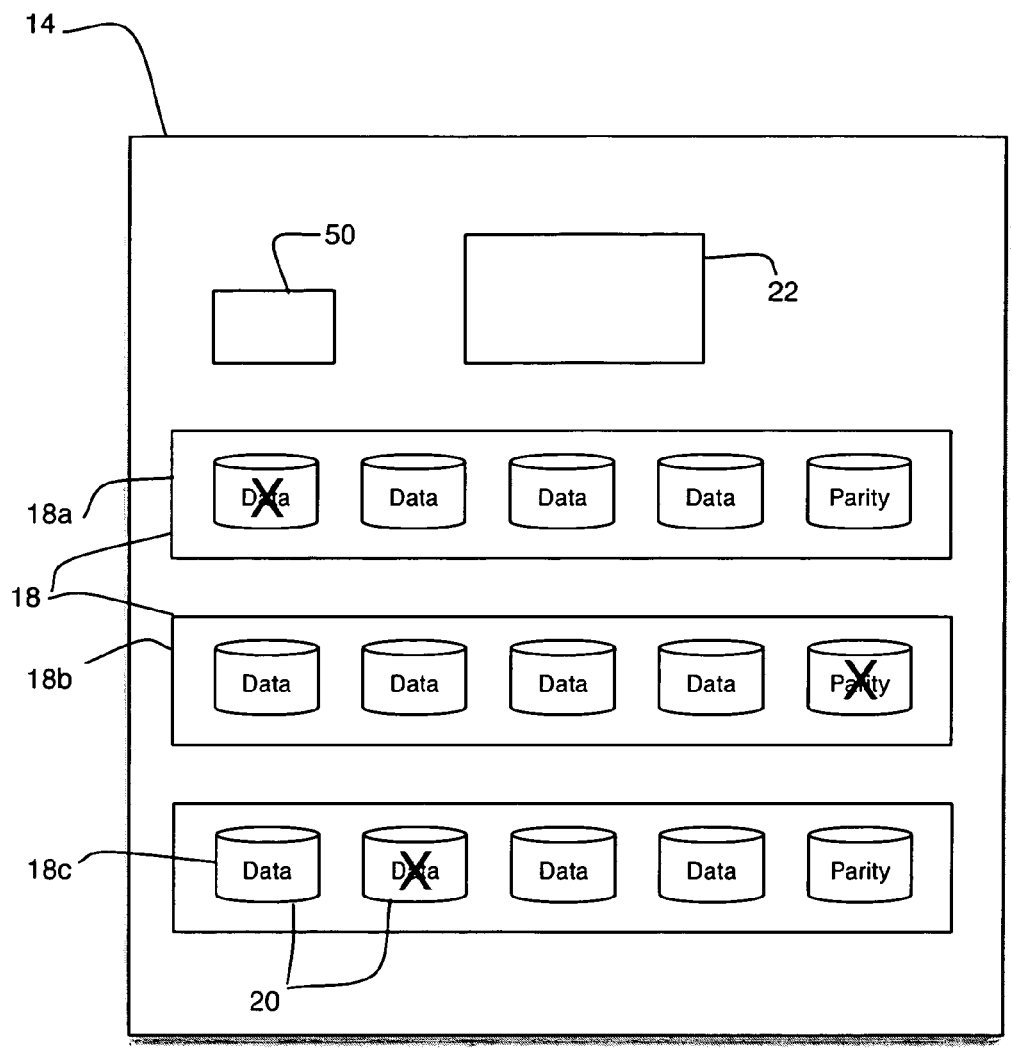
FIG. 6 is a representation of the storage array of FIG. 4 during power save mode, showing some disks spun down.

In FIG. 6 there is shown a representation of the array 14 of FIG. 4 during power save mode. In each RAID group 18, one of the disks 20 is spun down, as indicated by an "X". Note that, though the controller 18 operates on the RAID groups 18 one disk 20 at a time in order, the operations on the RAID groups 18 do not necessarily occur synchronously, so different disks 20 in each group 18 may be spun down at the same time. Furthermore, disks 20 in each group 18 may be spun down sequentially or in any desired order as design requirements dictate.

The invention is now described as applied to the general case, wherein m levels of redundancy are provided across a group of y disks. Each group of y disks may have a different value of m; that is, one group of y disks may have two levels of redundancy while another group of y disk has one. In some cases, the redundant information is spread across all y disks, as in a RAID level 5 implementation. In other cases, certain disks in a group store data while others store redundant information.

Figure 7:
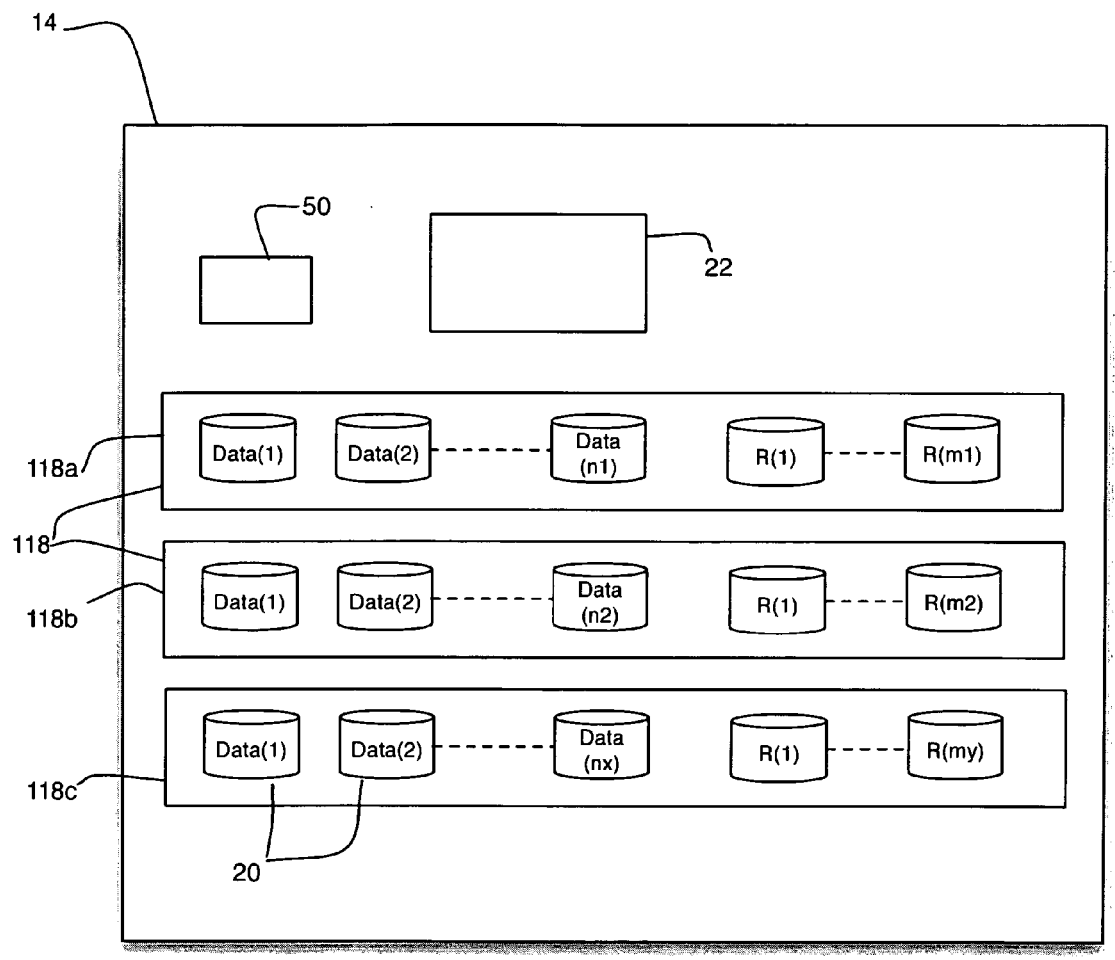
FIG. 7 is a representation of a generalized storage array in which each group of disk drives includes n data disks and m redundant disks.

In FIG. 7 there is shown a storage array 14 including groups 118 of disk drives 20. Each group 118 includes y disk drives. In this example, for simplicity, redundant information is stored on redundant disks rather than spread across the group. The y disk drives include n data storage devices and m redundant storage devices, that is, m levels of redundancy are employed across the y disks. Each group 118 has its own value of n and m. For instance, a group 118a in FIG. 7 is shown to include data disks Data(1)—Data($n_1$), and redundant disks R(1)-R($m_1$). In this case, data transfers can be performed successfully to the group 118a in light of up to and including $m_1$ disk drive failures. Likewise, a group 118b in FIG. 7 is shown to include data disks Data(1)-Data($n_2$), and redundant disks R(1)-R($m_2$). In this case, data transfers can be performed successfully to the group 118a in light of up to and including $m_2$ disk drive failures. One example of such an array 14 is a RAID level 6 array including several RAID 4+2 groups. In this case, each group 118 includes the equivalent of n=4 data disks and m=2 levels of redundancy. The invention as applied to the general case can be embodied in several ways, depending upon the level of failure protection required.

Figure 8:
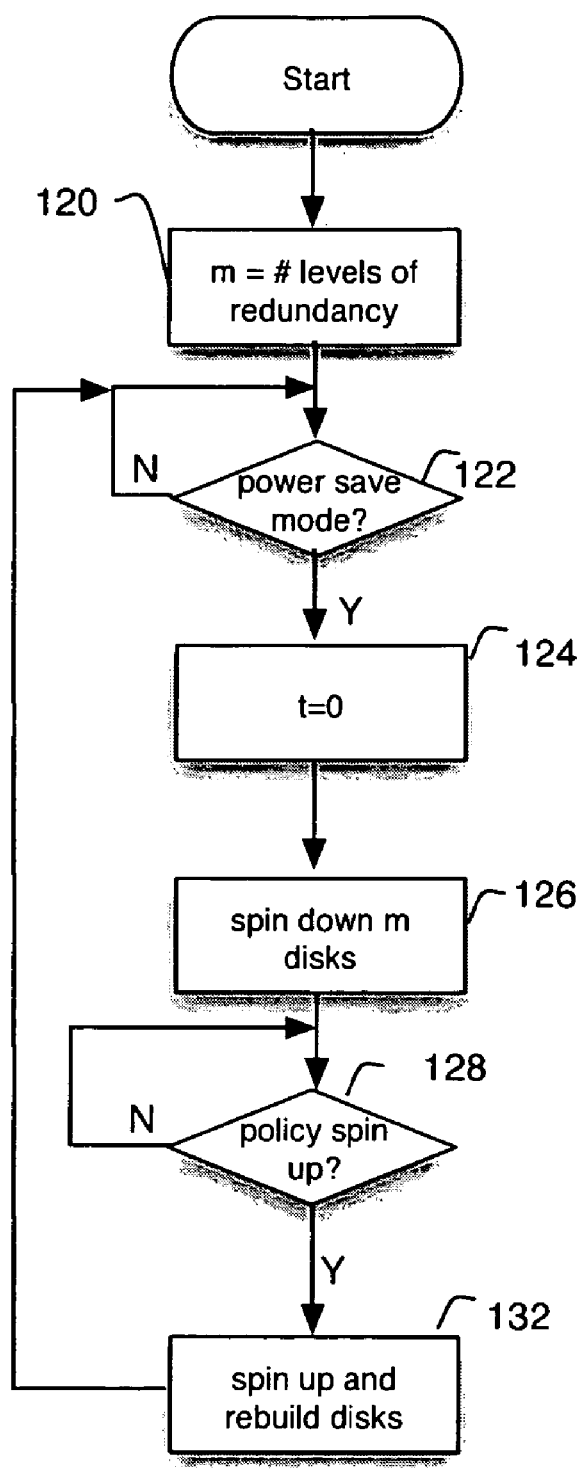
FIG. 8 is a flow diagram of a generalized process for operating the array controller in accordance with an embodiment of the invention.

In FIG. 8, there is shown a flow diagram of one embodiment of the invention. This embodiment generalizes the case of FIG. 3 by spinning down m disks 20 during power save mode. The variable "m" represents the number of levels of redundancy in a given RAID group (step 120); i.e. if a RAID group is a RAID level 6 group, then m=2. Thus, any two data or redundant drives can be spun down without loss of data transfer functionality. Again, the process of FIG. 8 is instantiated separately for each group in the array, and thus it is understood that m may be different for each group.

The process starts by setting the value m to the number of levels of redundancy for the group (step 120). When power save mode is entered (step 122), a timer t is reset (step 124) and m disks are spun down (step 126). As long as the spin up policy does not indicate that the m disks should be spun up (step 128), the m disks 20 remain spun down. Once the spin up policy indicates that the m disks should be spun up for any reasons previously described—for example, when t=spindown_time—the m disks 20 are spun up and rebuilt as needed (step 130), and the next m disks are spun down (step 126).

Again, writes can be performed during the process of FIG. 8, but they will not be performed redundantly. So, the caching process of FIG. 5 can be employed in addition to the embodiment of FIG. 8 as previously described. If writes are cached, then at step 132, the m disks are updated after being spun up.

Figure 9:
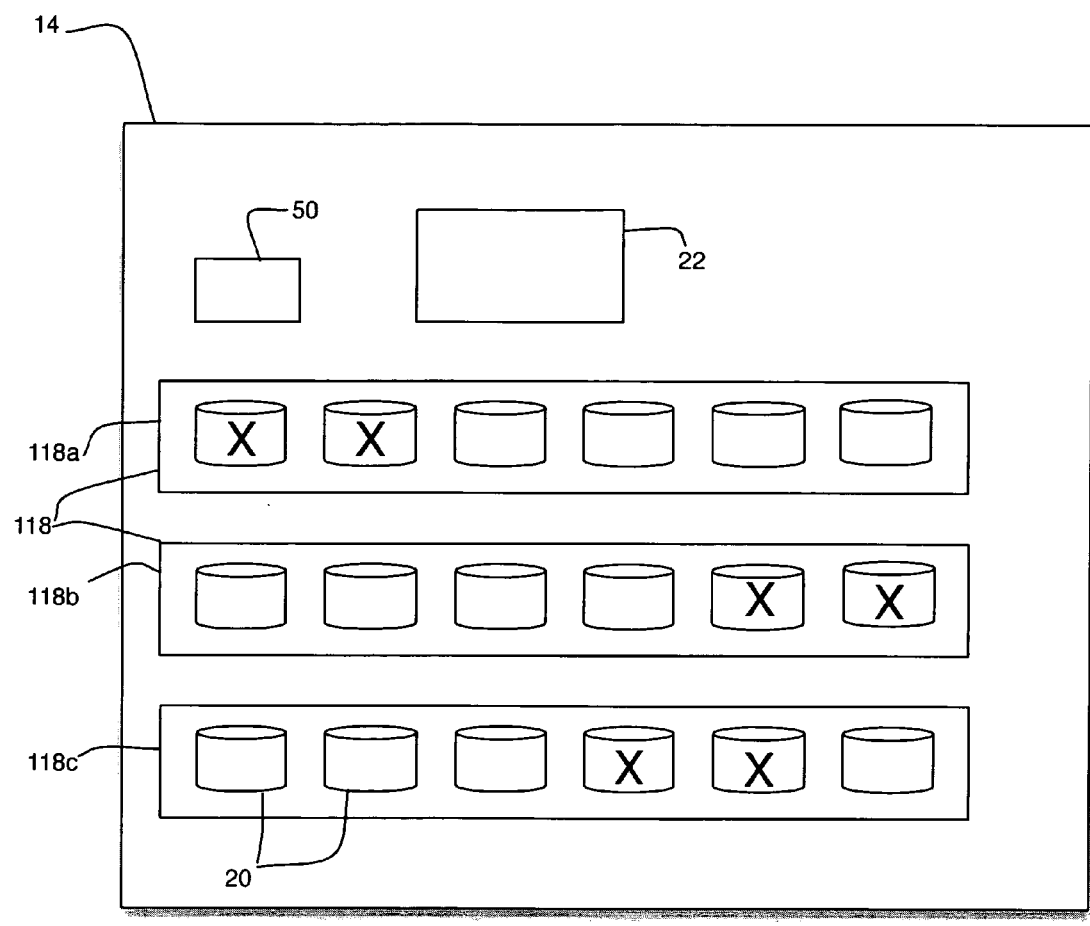
FIG. 9 is a representation of the storage array of FIG. 7 to which the process of FIG. 8 is applied, showing multiple disks per group spun down.

In FIG. 9, a RAID level 6 array 14 is shown as the process of FIG. 8 is applied. Each RAID 4+2 group 24 is shown as having two disks spun down. Again, the groups are operated upon independently.

Figure 10:
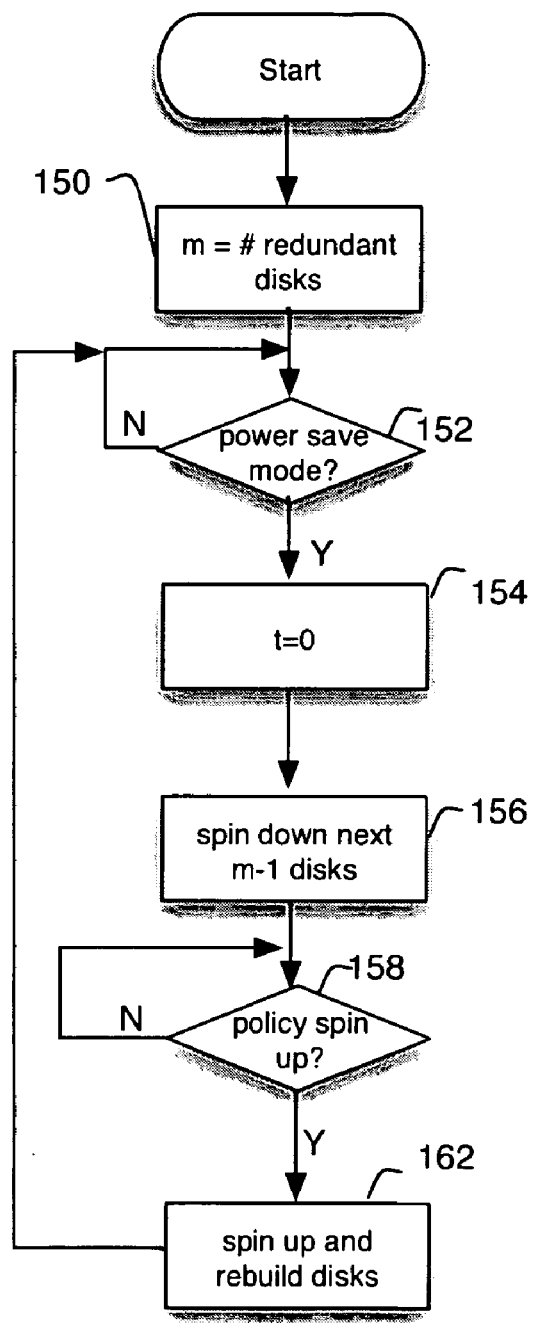
FIG. 10 is a flow diagram of a process for operating the array controller in accordance with another embodiment of the invention.
Figure 11:
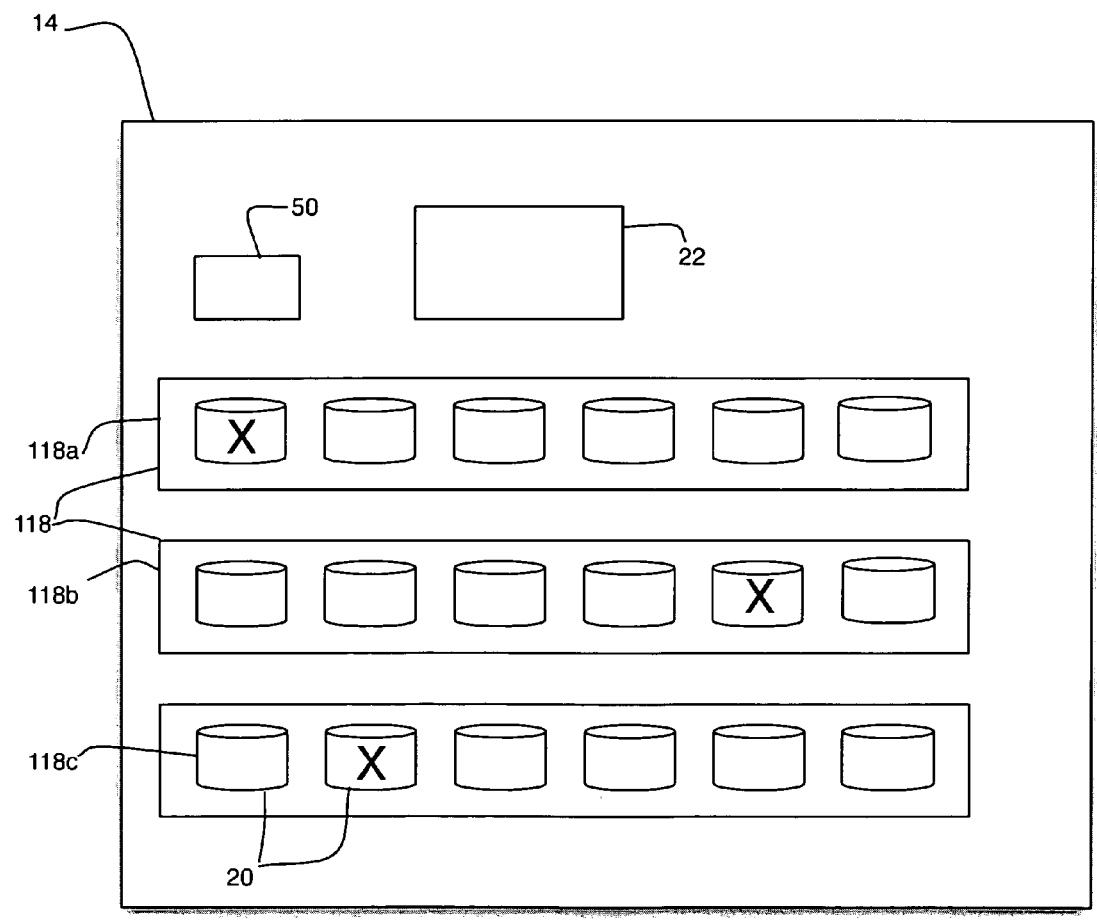
FIG. 11 is a representation of the storage array of FIG. 7 to which the process of FIG. 10 is applied.

In accordance with another embodiment, the number of levels of redundancy is greater than or equal to m=2, and at most m−1 disks are spun down during power save mode. In this mode, m levels of redundancy are provided during normal operation; that is, data transfers are completed successfully in light of up to any m disk failures. During power save mode, at least a single level of redundancy is provided. As seen in FIG. 10, a variable "m" represents the number of levels of redundancy in each group (step 150); i.e. if RAID groups are RAID level 6 groups, then m=2. When power save mode is entered (step 152), the timer t is reset (step 154) and m−1 drives are spun down (step 156). As long as the spin up policy does not indicate that the disks 20 should be spun up (step 158), the drives 20 remain spun down. Once a policy spin up is indicated—for instance, if t=spindown_time occurs—(step 158), the drives 20 are spun up and then rebuilt if required (step 162). If power save mode is still enabled, or when it is re-enabled, (step 152), the timer t is reset (step 154) and the next m−1 drives are spun down (step 156). Since at least one redundant drive is always online, write operations can be performed to each group 180 with no loss of redundancy during power save mode. The caching mechanism of FIG. 5 is therefore not required for data recovery when the method of FIG. 10 is employed, although the caching mechanism may be employed for other reasons. In FIG. 11, a RAID level 6 array 14 is shown as the process of FIG. 10 is applied. Each RAID 4+2 group 118 is shown as having one disk 20 spun down, leaving one redundant disk 20 per group 118. Again, the groups are operated upon independently.

In accordance another embodiment of the invention, each disk drive in each group is separately controlled and responsive to its own spin-down timer and spin up policy decision. Furthermore, each RAID group 118 may consist of a group of y disks including one or more standby spare disks that can be brought on-line to replace a failed disk in the group. In this embodiment, the number of levels of redundancy available takes into account the number of invoked, fully rebuilt, spun-up, accessible spare disks available (hereinafter "spares"), and the number of currently failed disks in each group 118.

Figure 12:
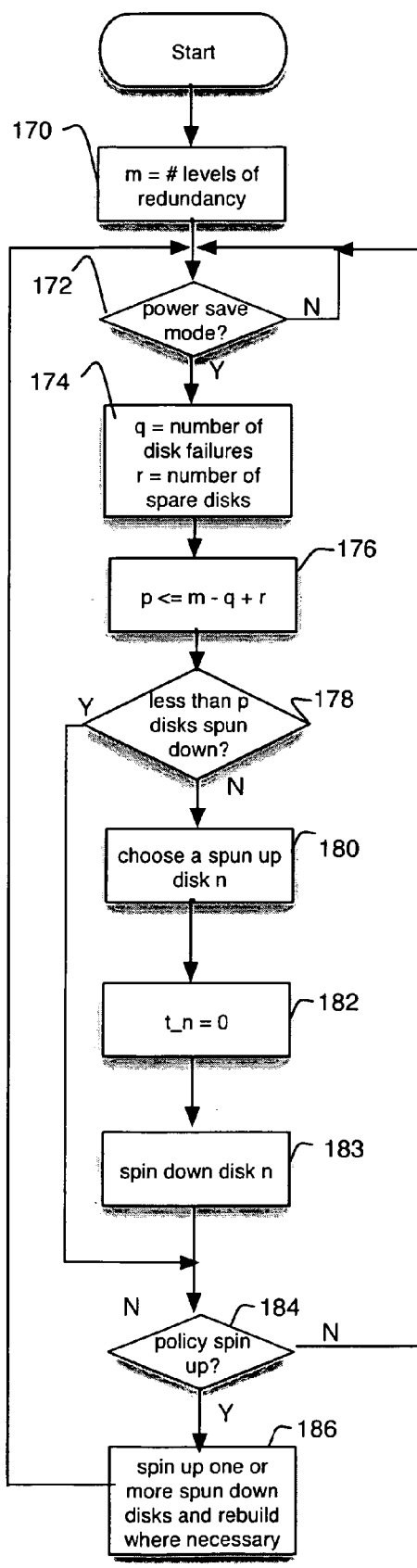
FIG. 12 is a flow diagram of a process for operating the array controller in accordance with a generalized embodiment of the invention.

Accordingly, referring to FIG. 12, each group in a system has m levels of redundancy where m may differ for each group. Each group may consist of a different number of drives, and the groups may implement different RAID levels. Thus, each group may have a different value of m. Each group may include one or more stand-by spares, and each group may include one or more failed disks at any time. For each group, a number of disks p less than or equal to the value of m plus the number of spares minus the number of failed disks is chosen to represent the number of disks in a group that will be spun down (step 172). The controller 22 then executes the process of FIG. 12 for each group; that is, if an array contains six groups of disk drives, then six instantiations of the process of FIG. 12 are executed.

According to an instantiation of the process of FIG. 12 as applied to a particular group, first the value of m is set to the number of levels of redundancy for the group (step 170). Then, power save mode is monitored (step 172). When in power save mode, a number of current disk failures q in the group, and the number of stand-by spares r invoked for the group (step 174) are used to determine a value of p (step 176), wherein p is less than or equal to m−q+r. The value p is the maximum number of disks that will be spun down during power save mode for the current values of q and r. (step 172). If power save mode is enabled, and fewer than p disks are not spun down (step 178), then one of the disks "n" is chosen to be spun down (step 180). A timer t_n, specific to the disk n, is set to 0 (step 182), and the disk n is spun down (step 183). If a policy spin up is indicated (step 184), then one of the spun down disks is spun up (step 186) and the process returns to step 172. If a policy spin up is not indicated, then the process returns to step 172. From step 172, q and p will again be evaluated in case either value has changed; thus, the value of p is dynamic. The process will continually spin down disks until the current value of p disks have been spun down. A policy spin up may result in the spinning up of one or more disks at step 186, depending on the particular policy invoked. For example, if p disks are spun down and a disk failure occurs, one disk may be spun up. If a write threshold is exceeded, all disks might be spun up. Furthermore, each of the p disks has its own spin down timer t_n, and each timer t_n may have a different timeout value spindown_time_n. If any timers t_n reach their timeout value spindown_time_n, a policy spin up is recognized at step 184 and that disk is spun up.

Furthermore, the policy spin up decision at step 184 can differ for each instantiation of the process of FIG. 132. For example, if one or more failures occur in a group, the spin up policy for the group can choose to spin up a disk based on a threshold number of failures. Furthermore, the policy can indicate which of the p disks to spin up based, for example, on how much rebuild might be required to bring a given disk back online. In this case, one or more disks would be spun up in accordance with the policy, while the others would remain spun down.

Figure 13:
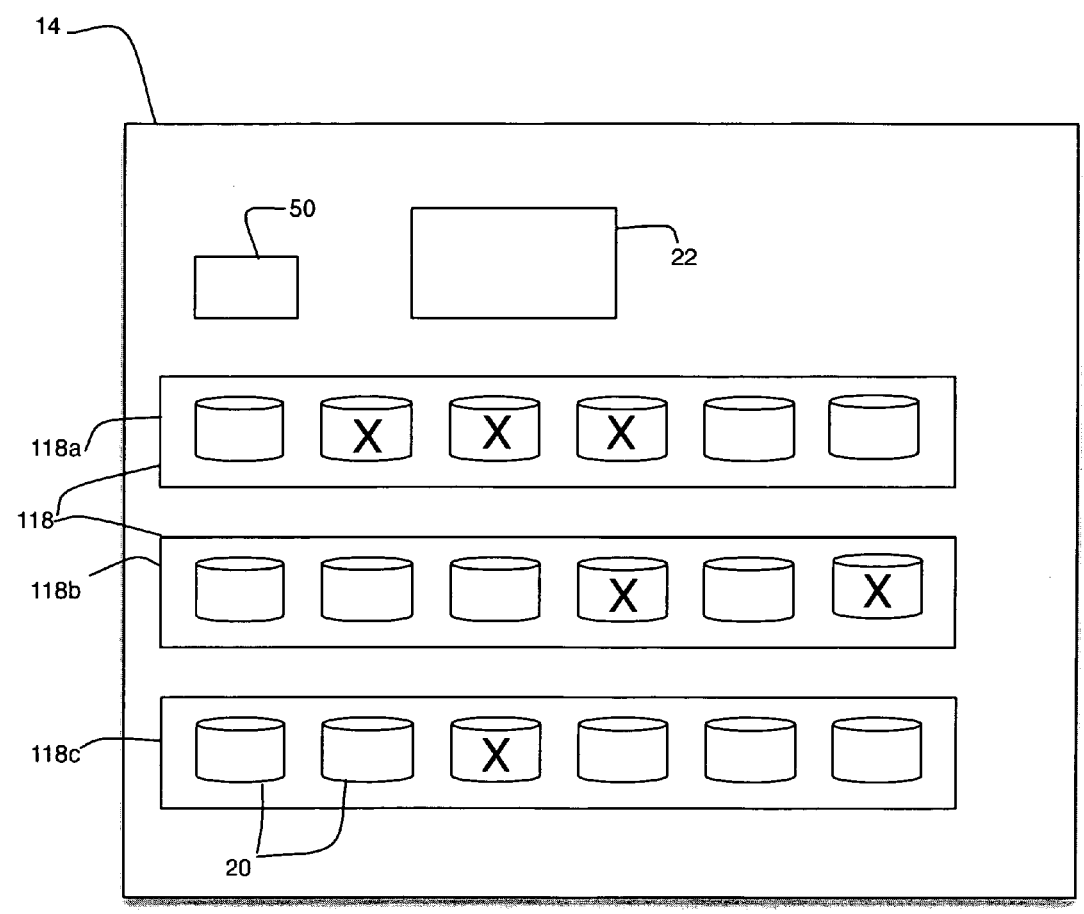
FIG. 13 is a representation of the storage array of FIG. 7 to which the process of FIG. 12 is applied.

In FIG. 13, there is shown an array 14 embodying the process of FIG. 12. Each group 118 includes y disks and m=3 levels of redundancy. For the group 118a, p=3. For the group 118b, p=2. For the group 118c, p=1.

Figure 14:
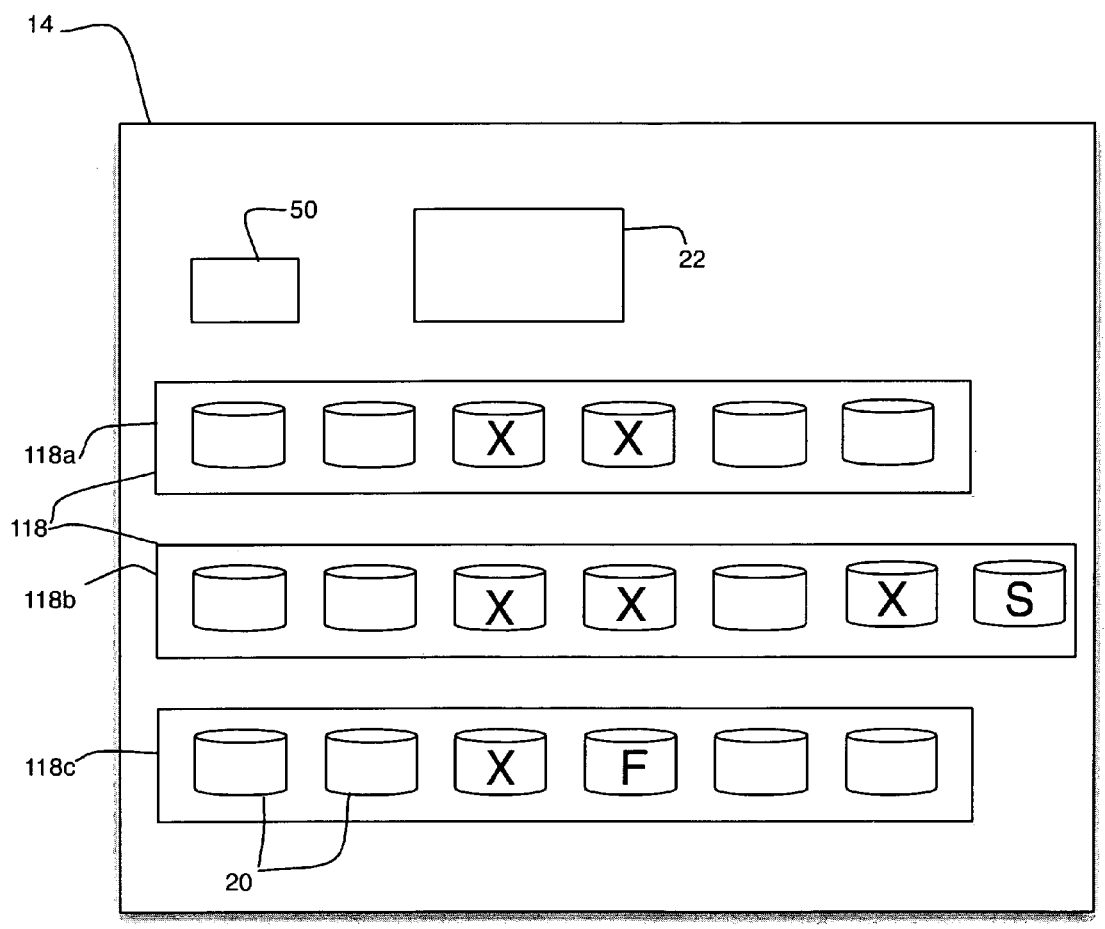
FIG. 14 is another representation of the storage array of FIG. 7 to which the process of FIG. 12 is applied.

In FIG. 14, there is shown another arrangement of an array 14 embodying the process of FIG. 12. A first group 118a group 118 includes y=6 disks, m=3 levels of redundancy, q=0 failures, r=0 spares, and p=up to 2. A second group 118b includes y=7 disks, m=2 levels of redundancy, q=0 failures, r=1 invoked spare (disk labeled "S"), and p=up to 3. A third group 118c includes y=6 disks, m=2 levels of redundancy, q=1 failure (disk labeled "F"), and thus p=0 or 1. It should be noted that once a spare becomes part of a group 118, it becomes one of the disks available for spin down. As can be seen from the examples of FIGS. 13 and 14, the process of FIG. 13 employs slightly more complexity for maximum flexibility.

The invention contemplates the fact that, in some array implementations, a single disk 20 can be shared between multiple RAID groups. For instance, a single disk 20 can be partitioned so that a first part of the disk 20 is associated with a RAID level 4 group, while a second part of the disk 20 is associated with a RAID level 6 group. In this case, the number of disks p to spin down must take the various RAID levels into account, to ensure that the lowest level of redundancy is not compromised.

Several advantages are attained by implementing the invention. Power savings is achieved by spinning down disks 20 in the array 14. The larger the array 14, the greater the power savings. Also, by spinning down each disk 20 for a period of time while not in use, the lifetime of the drive could be increased, leading to higher reliability and fewer repair calls.

The present invention is not to be limited in scope by the specific embodiments described herein. Various modifications of the present invention, in addition to those described herein, will be apparent to those of ordinary skill in the art from the foregoing description and accompanying drawings. One skilled in the art will understand that many specific implementations can be employed to achieve the logical functionality of the invention. For instance, the processes of FIGS. 3, 5, 8, 10, 12, and 13 may be implemented in hardware, software, firmware, or any combination thereof. All such variations and modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

I claim:

1. A method comprising the steps of:
providing an array including an array controller and multiple redundant array of independent disk (RAID) groups, each group including y storage devices, wherein data and redundant information is distributed across the y devices to provide m levels of redundancy, the redundant information usable to reconstruct the data in the event of a device failure;
entering the array into a power save mode and individually spinning down one of the y storage devices for a period of time;
spinning up the one of the y storage devices that was spun down after the period of time elapses;
selectively rebuilding the one of the y storage devices in areas where failure has occurred;
spinning down a second of the y storage devices for a period of time provided the power save mode is still enabled;
spinning up the second of the y storage devices that was spun down after the period of time elapses;
selectively rebuilding the second of the y storage devices in areas where failure has occurred;
continuing to individually spin up, spin down and rebuild each of the y storage devices provided that the power save mode is still enabled, until up to m of the y storage devices in the group have been spun up, spun down, and rebuilt where failure has occurred;
disabling the power save mode in accordance with a spin up policy after all of the up to m of the y storage devices has been spun up, spun down and rebuilt.

2. The method of claim 1 wherein the step of providing spun down devices comprises the step of spinning down a set of one or more of up to m of the y storage devices in the group while allowing data transfers to occur to and from the group of storage devices.

3. The method of claim 1 wherein the step of
spinning up one or more of the spun down devices is done in accordance with a policy.

4. The method of claim 3 wherein the policy indicates that the one or more of the spun down devices should be spun up in the event of a failure of a device.

5. The method of claim 3 wherein the policy indicates that the one or more of the spun down devices should be spun up in the event that a write threshold has been exceeded.

6. The method of claim 3 wherein the policy indicates that the one or more of the spun down devices should be spun up in the event that a predetermined time has elapsed.

7. The method of claim 3 wherein the policy indicates that the one or more of the spun down devices should be spun up in the event that a rebuild operation threshold has been exceeded.

8. The method of claim 3 wherein the policy indicates that the one or more of the spun down devices should be spun up in the event that a performance service level is not met.

9. Apparatus comprising:
a group of y storage devices, wherein data and redundant information is distributed across the y devices to provide m levels of redundancy, the redundant information usable to reconstruct the data in the event of a device failure;
logic for providing "spun down devices" for each of the one or more groups by spinning down a set of one or more of up to m of the y storage devices;
logic operable for spinning up one or more of the spun down devices in accordance with a policy; and
wherein the policy indicates that the one or more of the spun down devices should be spun up in the event that a rebuild operation threshold has been exceeded.

10. The apparatus of claim 9 wherein the logic for providing spun down devices comprises logic for spinning down a set of one or more of up to m of the y storage devices in the group while allowing data transfers to occur to and from the group of storage devices.

11. The apparatus of claim 10 wherein the logic for providing spun down devices spins down one or more of up to m storage devices for a predetermined time.

12. The apparatus of claim 11 further comprising logic operable for:
spinning up the spun down devices after the predetermined time; and
providing new spun down devices by spinning down another set of one or more of up to m of the y storage devices.

13. The apparatus of claim 9 wherein the policy further indicates that the one or more of the spun down devices should be spun up in the event of a failure of a device.

14. The apparatus of claim 9 wherein the policy further indicates that the one or more of the spun down devices should be spun up in the event that a write threshold has been exceeded.

15. The apparatus of claim 9 wherein the policy further indicates that a predetermined time has elapsed.

16. The apparatus of claim 9 wherein the policy further indicates that the one or more of the spun down devices should be spun up in the event that a performance service level is not met.

17. A program product comprising a computer readable medium having embodied therein a computer program for storing data, the computer comprising:
logic for operation with a group of y storage devices, wherein data and redundant information is distributed across the y devices to provide m levels of redundancy, the redundant information usable to reconstruct the data in the event of a device failure;
the logic operable to provide "spun down devices" by individually spinning down a set of one or more of up to m of the y storage devices for a period of time when the array is in a power save mode;
the logic being further operable to spin up and rebuild the individually spun down y storage devices after spinning down while continuing to individually spin up, spin down and rebuild up to each m of the y storage devices until the power save mode has been disabled.

18. The program product of claim 17 wherein the logic operable to provide spun down devices comprises logic for spinning down a set of one or more of up to m of the y storage devices while allowing data transfers to occur to and from the groups of storage devices.

19. The program product of claim 17 further comprising logic operable to spin up one or more of the spun down devices in accordance with a policy.

20. The program product of claim 19 wherein the policy indicates that the one or more of the spun down devices should be spun up in the event of a failure of a device.

21. The program product of claim 19 wherein the policy indicates that the one or more of the spun down devices should be spun up in the event that a write threshold has been exceeded.

22. The program product of claim 19 wherein the policy indicates that the one or more of the spun down devices should be spun up in the event that a predetermined time has elapsed.

23. The program product of claim 19 wherein the policy indicates that the one or more of the spun down devices should be spun up in the event that a rebuild operation threshold has been exceeded.

24. The program product of claim 19 wherein the policy indicates that the one or more of the spun down devices should be spun up in the event that a performance service level is not met.

25. The program product of claim 17 further comprising logic operable to disable the power save mode after up to m of the y storage devices has been spun up, spun down and rebuilt.

* * * * *